United States Patent [19]

Yoshinaga et al.

[11] 3,886,039

[45] May 27, 1975

[54] METHOD FOR PRODUCING L-GLUTAMINE

[75] Inventors: Fumihiro Yoshinaga, Fujisawa; Takayasu Tsuchida; Kenji Kikuchi, both of Kawasaki; Shinji Okumura, Tokyo, all of Japan

[73] Assignee: Ajinomoto Co., Inc., Tokyo, Japan

[22] Filed: Dec. 12, 1973

[21] Appl. No.: 424,094

[30] Foreign Application Priority Data
Dec. 16, 1972 Japan.............................. 47-126484

[52] U.S. Cl. ...................... 195/29; 195/47; 195/112
[51] Int. Cl............................................... C12d 13/06
[58] Field of Search ............ 195/29, 47, 42, 79, 112

[56] References Cited
UNITED STATES PATENTS
3,414,478  12/1968  Noguchi et al. ...................... 195/29

OTHER PUBLICATIONS

CA 71:122387t.

CA 68:94654v.

Primary Examiner—Lionel M. Shapiro
Assistant Examiner—Thomas G. Wiseman
Attorney, Agent, or Firm—Hans Berman; Kurt Kelman

[57] ABSTRACT

Mutant strains of genera Brevibacterium Corynebacterium and Microbacterium which resist the growth inhibiting effect of at least one sulfa drug produce L-glutamine by fermentation of otherwise conventional culture media in higher yields than the known L-glutamine-producing strains.

2 Claims, No Drawings

METHOD FOR PRODUCING L-GLUTAMINE

This application relates to the production of L-glutamine, and particulary to a method of producing L-glutamine by bacterial fermentation.

L-Glutamine is classified as an amino acid nonessential to rats, but it has been found applications as a raw material for cosmetics and medicine, or as a food supplement. An object of the present invention is the provision of L-glutamine at lower cost than was available until now.

It is known that L-glutamine is produced together with glutamic acid by a fermentative method employing glutamic acid producing strains of genera Brevibacterium, Bacillus, Micrococcus, Microbacterium and Escherichia (Japanese Pat. Publication No. 5449/1964, No. 7391/1964, No. 12474/1965 and No. 7595/1967).

We now have found that L-glutamine is produced at higher concentrations than were available heretofore under comparable conditions by mutant strains which have resistance to at least one sulfa drug when these mutants are cultured on otherwise conventional media including sources of assimilable carbon and nitrogen, inorganic ions, and unspecific organic growth promoting agents.

The mutants of the invention are derived by means of conventional mutagenic agents, such as ultra-violet light, X-rays, or gamma rays in mutagenic doses, and sodium nitrite, nitrosoguanidine or diethyl sulphate solution, from glutamic acid producing microorganisms of genera Brevibacterium, Corynebacterium and Microbacterium, and by screening of the mutants so produced for the necessary resistance to growth inhibition by sulfa drugs. Such a mutant may also be obtained, without using mutagenic agents, by screening strains having resistance to sulfa drugs from colonies of the parent strain cultured on a medium containing said sulfa drugs.

When the mutant strains having resistance to sulfa drugs are derived from parent strains having glutamine-producing ability, the quantity of glutamine produced is considerably increased.

The microorganisms employed in the present method may combine a nutrientrequirement and/or resistance to other reagents with resistance to sulfa drugs.

The sulfa drugs to which the mutants employed in the present invention are resistant, have the following general features and are generally known as antagonists to p-aminobenzoic acid. 1. They contain in their molecule a group of the general formula:

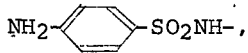

and have anti-microbial action as a general rule. 2. The anti-microbial action against usual wild strains is suppressed by addition of p-aminobenzoic acid.

Such sulfa drugs having the foregoing features include sulfapyridine, sulfathiazole, phthalylsulfathiazole, sulfadiazine, sulfaguanidine, sulfamethazine, sulfamerazine, sulfadimethoxine, sulfamethomidine, sulfamethoxypyridazine, sulfisomidine, sulfisoxazole, acetosulfamine, sulfanylamide, sulfisomezole, sulfaphenazole, sulfamethizole, sulfaethidole, sulfapyrazine, irgafen and irgamide.

The most effective glutamine-producing mutants found so far are Brevibacterium flavum FERM P-1684, Brevibacterium flavum FERM P-2371, Corynebacterium glutamicum FERM P-2372, Coryne-bacterium glutamicum FERM P-2373, and Microbacterium flavum FERM P-2374.

Specimen cultures of microorganisms identified by a FERM P-number are freely available to qualified persons without our permission from the Fermentation Research Institute, Agency of Industrial Science of Technology, the Ministry of Industrial Trade and Industry, at 1-8-5, Inage Higashi, Chiba-shi, Chiba, Japan.

The method for obtaining mutant strains having resistance to sulfa drugs is illustrated by following Experiments:

EXPERIMENT 1

1. Brevibacterium flavum ATCC 14067 was treated with 200 μg/ml nitrosoguanidine at 30°C for 30 minutes, and was inoculated on an agar plate containing 2 percent glucose, 0.2 percent urea, 1 percent ammonium sulfate, 0.3 percent $K_2HPO_4$, 0.1 percent $KH_2PO_4$, 0.04 percent $MgSO_4.7H_2O$, 2 ppm $Fe^{++}$, 50 μg/l biotin, 350 μg/l thiamine.HCl, 400 μg/ml sulfaguanidine, and 2 percent agar, at pH 7.0. After 4 to 10 days culturing at 31°C, mutant strains having resistance to sulfa drugs were isolated from about 100 colonies appearing on the cultured agar plate, and from which three mutant strains having an ability to produce a large amount of L-glutamine were selected. The three mutant strains were confirmed to have no specific nutrient requirements. Brevibacterium flavum AJ-3409 (FERM P-1684) and AJ-3681 (FERM P-2371) were obtained as mentioned above.

Corynebacterium glutamicum AJ-3682 (FERM P-2372), Corynebacterium glutamicum AJ-3683 (FERM P-2373) and Microbacterium flavum AJ-3684 (FERM P-2374) were also obtained by the same process as mentioned above from parent strains Micrococcus glutamicus ATCC 21010 (the taxonomical denomination of this strain was changed to Corynebacterium glutamicum) and Microbacterium flavum ATCC 10340 respectively, and were confirmed to be glutamine-producing mutants having a resistance to sulfa drugs. 2. Growth test of strain Brevibacterium flavum FERM P-1684 in a medium containing varying amount of sulfaguanidine:

The parent strain Brevibacterium flavum ATCC 14067 and the mutant strain FERM P-1684 were cultured for 24 hours on nutrient agar slants. The cultures were washed with a liquid medium having the following composition indicated below, and inoculated on 3 ml batches of the medium supplemented with sulfaguanidine as specified in Table 1. The microbial cells inoculated into each medium amounted to about $1.5 \times 10^7$.

| Composition of the medium; | | |
|---|---|---|
| Glucose | 2 | % |
| $(NH_4)_2SO_4$ | 1 | % |
| Urea | 0.2 | % |
| $KH_2PO_4$ | 0.1 | % |
| $K_2HPO_4$ | 0.3 | % |
| $MgSO_4.7H_2O$ | 0.1 | % |
| $Fe^{++}$ | 2 | ppm |
| $Mn^{++}$ | 2 | ppm |
| Biotine | 50 | μg/l |
| Thiamine.HCl | 100 | μg/l |
| (pH 7.0) | | |

The cultivation was carried out at 31.5°C for 48 hours, and the actual growth and relative growth of each strain on media containing different amounts of sulfaguanidine was found to be as shown in the following Table 1.

Table 1

| Sulfaguanidine (μg/ml) | | 0 | 100 | 200 | 300 | 400 | 500 | 600 |
|---|---|---|---|---|---|---|---|---|
| B. Flavum | Growth | 0.580 | 0.580 | 0.470 | 0.300 | 0.000 | 0.000 | 0.000 |
| ATCC 14067 | Relative Growth | 100 | 100 | 81.2 | 51.7 | 0 | 0 | 0 |
| B. Flavum | Growth | 0.420 | 0.420 | 0.418 | 0.375 | 0.250 | 0.120 | 0.000 |
| FERM P-1684 | Relative Growth | 100 | 100 | 99.5 | 89.3 | 59.5 | 28.6 | 0 |

[Note] Growth: Each cultured broth was diluted with 25 volumes of water, and its optical density (OD) was determined as a measure of growth by measuring light absorbancy at 562 mμ.

3. Growth of the strains Corynebacterium glutamicum FERM P-2372 and Microbacterium flavum FERM P-2374 in a medium containing varying amounts of sulfaguanidine and sulfamethoxypyridazine respectively was tested as described in section (2).

The results were as shown in the following Tables 2 and 3.

Table 2

| Sulfaguanidine (μg/ml) | | 0 | 100 | 200 | 300 | 400 | 500 |
|---|---|---|---|---|---|---|---|
| M. glutamicus | Growth | 0.500 | 0.500 | 0.500 | 0.450 | 0.200 | 0.000 |
| ATCC 21010 | Relative Growth | 100 | 100 | 100 | 90 | 40 | 0 |
| C. glutamicum | Growth | 0.480 | 0.480 | 0.470 | 0.480 | 0.470 | 0.475 |
| FERM P-2372 | Relative Growth | 100 | 100 | 97.9 | 100 | 97.9 | 95 |

Table 3

| Sulfamethoxypyridazine (μg/ml) | | 0 | 100 | 200 | 300 | 400 | 500 |
|---|---|---|---|---|---|---|---|
| M. flavum | Growth | 0.520 | 0.520 | 0.500 | 0.200 | 0.000 | 0.000 |
| ATCC 10340 | Relative Growth | 100 | 100 | 96.2 | 38.5 | 0 | 0 |
| M. flavum | Growth | 0.500 | 0.500 | 0.490 | 0.490 | 0.500 | 0.380 |
| FERM P-2374 | Relative Growth | 100 | 100 | 98 | 98 | 100 | 76 |

The fermentation medium may be a natural nutrient medium or a synthetic nutrient medium providing the basic needs of the microorganisms of the invention.

Suitable carbon sources include the usual carbohydrates, such as glucose, fructose, maltose, sucrose, starch, starch hydrolyzate, molasses, also organic acids, particularly acetic acid, propionic acid, fumaric acid, or benzoic acid and alcohols, particularly methanol and ethanol, and a medium may contain several different carbon sources. Some of the new mutants assimilate hydrocarbons as a major or minor carbon source.

Nitrogen may be supplied by ammonium salts, nitrates, urea, amino acids, cornsteep liquor, yeast extract, meat extract, fish meal, peptone, bouillon, casein hydrolyzates, and mixtures thereof, and also by ammonia.

Necessary inorganic ions may be provided by magnesium sulfate, sodium phosphate, potassium mono- and dihydrogen phosphate, iron sulfate, manganese chloride, calcium chloride, sodium chloride and others.

For a good yield of glutamine, the fermentation should be carried out aerobically with aeration and/or agitation. To produce an optimum yield, the pH should be controlled within the range from 5.5 to 8.5. The desired pH may be maintained by adding gaseous or aqueous ammonia, calcium carbonate, alkali metal hydroxide, urea or organic or inorganic acids to the medium from time to time; certain of these additives also supply assimilable nitrogen. When the fermentation is carried out at a temperature in the range from 24°C to 37°C, the concentration of glutamine in the broth usually reaches its maximum within from 2 to 5 days.

Conventional methods may be used for recovering the accumulated glutamine from the culture broth, preferably after removal of the microbial cells by filtration or centrifuging. Ion exchange resins conveniently absorb glutamine from the cell free broth. Crystalline L-glutamine is obtained from the eluate by conventional methods.

The following Examples are further illustrative of this invention.

EXAMPLE 1

A fermentation medium was prepared to the following composition:

| Glucose | 10 | % |
|---|---|---|
| Ammonium sulfate | 1 | % |
| $KH_2PO_4$ | 0.25 | % |
| $MgSO_4 \cdot 7H_2O$ | 0.04 | % |
| $FeSO_4 \cdot 7H_2O$ | 1 | mg % |
| Thiamine hydrochloride | 350 | γ/l |
| Biotin | 5 | γ/l |
| Soybean protein hydrolyzate | 0.5 | ml/dl |
| ph 7.0 | | |

300 Ml batches of the medium were introduced in glass jar fermentors, and were sterilized by steam. The media were inoculated with Brevibacterium flavum FERM P-1684 (mutant strain having resistance to sulfaguanidine), which had previously been cultured on bouillon slants for 24 hours at 31.5°C. The fermentation was carried out at 1200 rpm at 31.5°C for 30 hours while aerating with ¼ volume of air per minute and volume of broth. The pH of each medium was held about 6.5 by addition of gaseous ammonia. 3.9 G/dl of L-glutamine were found in the broth after 30 hours' cultivation.

The cultured broth was centrifuged to remove the cells, and one liter of the supernatant was stripped of L-glutamine by passage over a column of an ion exchange resin. 15.5 G of crystaline L-glutamine was recovered from the broth by a conventional method.

On the other hand, only 0.85 g/dl of L-glutamine were found in the broth in which Brevibacterium flavum ATCC 14067 was cultured in the same way.

EXAMPLE 2

Corynebacterium glutamicum FERM P-2372, Corynebacterium glutamicum FERM P-2373, Microbacterium flavum FERM P-2374, Brevibacterium flavum FERM P-2371 and their parent strains Micrococcus glutamicus ATCC 21010, Brevibacterium flavum ATCC 14067 and Microbacterium flavum ATCC 10340 were cultured as described in Example 1.

After 30 hours cultivation, the amounts of L-glutamine produced in the respective broths were as shown in the following Table 4.

Table 4

| Microorganism employed | L-glutamine |
|---|---|
| Corynebacterium glutamicum FERM P-2372 | 3.80 |
| Corynebacterium glutamicum FERM P-2373 | 3.75 |
| Micrococcus glutamicus ATCC 21010 | 0.90 |
| Microbacterium flavum FERM P-2374 | 3.60 |
| Microbacterium flavum ATCC 10340 | 0.92 |
| Brevibacterium flavum FERM P-2371 | 4.20 |
| Brevibacterium flavum ATCC 14067 | 1.10 |

EXAMPLE 3

A fermentation medium was prepared to the following composition:

| Glucose | 10 | % |
|---|---|---|
| Ammonium sulfate | 7 | % |
| KH$_2$PO$_4$ | 0.25 | % |
| MgSO$_4$.7H$_2$O | 0.04 | % |
| FeSO$_4$.7H$_2$O | 1 | mg % |
| Thiamine hydrochloride | 350 | γ/l |
| Biotin | 5 | γ/l |
| Soybean protein hydrolyzate | 0.5 | ml/dl |
| CaCO$_3$ | 4 | % |
| pH 6.5 | | |

20 ml batches of the medium were introduced in 500 ml shaking flasks, and were sterilized by steam. The respective media were inoculated with the six strains referred to in the following Table 5 which had been previously cultured on bouillon slants for 24 hours at 30°C. The fermentation was carried out at 31.5°C for 48 hours with shaking.

The L-glutamine produced in each culture broth after 48 hours cultivation is shown in the following Table 5.

Table 5

| Microorganism employed | L-glutamine produced (g/dl) |
|---|---|
| Brevibacterium flavum FERM P-1684 | 3.30 |
| Brevibacterium flavum ATCC 14067 | 1.50 |
| Corynebacterium glutamicum FERM P-2372 | 3.20 |
| Micrococcus glutamicus ATCC 21010 | 1.40 |
| Microbacterium flavum FERM P-2374 | 2.80 |
| Microbacterium flavum ATCC 10340 | 1.00 |

EXAMPLE 4

The five strains referred to in the following Table 6 were inoculated on respective seed culture media having the composition shown hereunder, and were cultured at 31°C for 12 hours with stirring and aeration.

Composition of the seed culture medium:

| Starch hydrolyzate (calculated as glucose) | 1.5 | % |
|---|---|---|
| Ammonium acetate | 0.3 | % |
| Ammonium sulfate | 0.3 | % |
| KH$_2$PO$_4$ | 0.15 | % |
| MgSO$_4$.7H$_2$O | 0.04 | % |
| FeSO$_4$.7H$_2$O | 1 | mg % |
| Soybean protein hydrolyzate | 1 | ml/dl |
| Thiamine hydrochloride | 350 | γ/l |
| Biotin | 3 | γ/l |
| Urea | 0.1 | % |

Respective 15 ml inocula of the seed cultures were added to 300 ml batches of a main culture medium in glass jar fermentors, said main culture medium having the following composition.

Composition of the main culture medium:

| Ammonium acetate | 0.8 | % |
|---|---|---|
| Sodium acetate | 0.41 | % |
| Ammonium sulfate | 1 | % |
| KH$_2$PO$_4$ | 0.25 | % |
| MgSO$_4$.7H$_2$O | 0.04 | % |
| FeSO$_4$.7H$_2$O | 1 | mg % |
| Soybean protein hydrolyzate | 1 | ml/dl |
| Biotin | 5 | γ/l |
| Thiamine hydrochloride | 350 | γ/l |
| pH 7.2 | | |

The fermentation mixtures were stirred at 1200 rpm at 31°C and aerated with one volume of air per minute and volume of broth. The pH of each medium was held automatically between 7.0 and 8.0 addition of a 70 percent solution of acetic acid and gaseous ammonia. After 48 hours, it was found that each strain had produced L-glutamine in each culture broth in an amount shown in Table 6.

Table 6

| Microorganism employed | L-glutamine (g/dl) | Conversion rate (%) |
|---|---|---|
| Brevi. flavum FERM P-1684 | 4.25 | 26.0 |
| Coryne. glutamicum FERM P-2372 | 4.00 | 25.0 |
| Microc. glutamicus ATCC 21010 | 1.60 | 11.0 |
| Microb. flavum FERM P-2374 | 3.50 | 20.0 |
| Microb. flavum ATCC 10340 | 1.20 | 8.0 |

The cultured broth of strain Brevibacterium flavum FERM P-1684 was centrifuged to remove the cells, and 7.5 g of crude crystaline L-glutamine were obtained from 380 ml of the broth by a conventional method.

EXAMPLE 5

The six strains referred to in the following Table 7 were inoculated on respective seed culture media having the following composition, and were cultured at 30°C for 18 hours with stirring and aeration.

Composition of the seed culture medium:

| Glucose | 2 | % |
|---|---|---|
| Ethanol | 0.5 | % |
| Ammonium sulfate | 0.5 | % |
| KH$_2$PO$_4$ | 0.15 | % |

| | | |
|---|---|---|
| MgSO₄.7H₂O | 0.14 | % |
| FeSO₄.7H₂O | 1 | mg % |
| Soybean protein hydrolyzate | 3 | ml/dl |
| Biotin | 3 | γ/l |
| Thiamine hydrochloride | 350 | γ/l |
| Urea | 0.2 | % |
| pH 7.0 | | |

Respective 30 ml inocula of the seed cultures were added to 300 ml batches of a main culture medium of the following composition in glass jar fermentors.

Composition of the main culture medium:

| | | |
|---|---|---|
| Ethanol | 1.5 | % |
| Ammonium sulfate | 1 | % |
| KH₂PO₄ | 0.25 | % |
| MgSO₄.7H₂O | 0.04 | % |
| FeSO₄.7H₂O | 1 | mg % |
| Soybean protein hydrolyzate | 1 | ml/dl |
| Biotin | 5 | γ/l |
| Thiamine hydrochloride | 350 | γ/l |
| pH 7.2 | | |

The fermentation mixtures were stirred at 1,200 rpm at 31.5°C and aerated with ½ volume of air per minute and volume of broth.

During the fermentation, the pH of each medium was held between 6.5 and 7.5 by addition of gaseous ammonia. The ethanol content of each medium was determined by gas chromatography, and the ethanol was replenished whenever residual ethanol fell to about 0.1 percent.

After 48 hours, it was found that each strain had produced L-glutamine in each culture broth in an amount shown in Table 7.

Table 7

| Microorganism employed | L-glutamine (g/dl) | Conversion rate(%) |
|---|---|---|
| Brevi. flavum FERM P-1684 | 3.50 | 38.5 |
| Brevi. flavum ATCC 14067 | 1.95 | 20.5 |
| Coryne. glutamicum FERM P-2372 | 3.40 | 35.0 |
| Microc. glutamicus ATCC 21010 | 1.20 | 12.0 |
| Microb. flavum FERM P-2374 | 3.00 | 29.0 |
| Microb. flavum ATCC 10340 | 1.05 | 10.0 |

What we claim is:

1. A process for producing L-glutamine which comprises culturing a microorganism resistant to at least one sulfa drug of the group consisting of sulfapyridine, sulfathiazole, phthalylsulfathiazole, sulfadiazine, sulfaguanidine, sulfamethazine, sulfamerazine, sulfadimethoxine, sulfamethomidine, sulfamethoxypyridazine, sulfisomidine, sulfisoxazole, acetosulfamine, sulfanylamide, sulfisomezole, sulfaphenazole, sulfamethizole, sulfaethidole, sulfapyrazine, irgafen and irgamide, under aerobic conditions in an aqueous culture medium containing assimilable sources of carbon and nitrogen and inorganic salts necessary for the growth of said miroorganism until L-glutamate accumulates in said medium, and recovering accumulated L-glutamine from said culture medium, said microorganism being Brevibacterium flavum FERM P-1684, Brevibacterium flavum FERM P-2371, Corynebacterium glutamicum FERM P-2372, Corynebacterium glutamicum FERM P-2373 or Microbacterium flavum FERM P-2374.

2. A process as set forth in claim 1, wherein said culture medium is free of sulfa drugs of said group.

* * * * *